(12) United States Patent
Hosokawa et al.

(10) Patent No.: US 12,351,506 B2
(45) Date of Patent: Jul. 8, 2025

(54) GLASS COMPOSITION FOR GLASS FIBERS, GLASS FIBERS, GLASS FIBER TEXTILE, AND GLASS FIBER-REINFORCED RESIN COMPOSITION

(71) Applicant: NITTO BOSEKI CO., LTD., Fukushima (JP)

(72) Inventors: Takanobu Hosokawa, Koriyama (JP); Tatsuya Komukai, Koriyama (JP); Jun Ito, Koriyama (JP); Kazuaki Takagi, Koriyama (JP); Tadashi Kurita, Koriyama (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 18/861,315

(22) PCT Filed: Jun. 5, 2023

(86) PCT No.: PCT/JP2023/020837
§ 371 (c)(1),
(2) Date: Oct. 29, 2024

(87) PCT Pub. No.: WO2024/047988
PCT Pub. Date: Mar. 7, 2024

(65) Prior Publication Data
US 2025/0109061 A1  Apr. 3, 2025

(30) Foreign Application Priority Data

Aug. 29, 2022 (JP) ................................ 2022-136222

(51) Int. Cl.
*C03C 13/00* (2006.01)
*C03C 3/083* (2006.01)
*C03C 3/091* (2006.01)
*C08J 5/04* (2006.01)
*D03D 15/267* (2021.01)

(52) U.S. Cl.
CPC .............. *C03C 13/00* (2013.01); *C03C 3/083* (2013.01); *C03C 3/091* (2013.01); *C08J 5/043* (2013.01); *D03D 15/267* (2021.01)

(58) Field of Classification Search
CPC .. C03C 3/083–091; C03C 3/097; C03C 3/118
See application file for complete search history.

(56) References Cited

U.S. PATENT DOCUMENTS

| | | | |
|---|---|---|---|
| 5,958,808 A * | 9/1999 | Mori ....................... | C03C 13/00 501/36 |
| 2007/0027019 A1 | 2/2007 | Nishizawa et al. | |
| 2007/0213195 A1* | 9/2007 | Hikata .................... | C03C 3/093 501/67 |
| 2020/0199015 A1 | 6/2020 | Hosokawa et al. | |
| 2022/0363585 A1* | 11/2022 | Saito ....................... | C03B 17/06 |
| 2023/0054936 A1 | 2/2023 | Pizzagalli | |

FOREIGN PATENT DOCUMENTS

| | | | |
|---|---|---|---|
| CN | 109626816 A | | 4/2019 |
| EP | 1653499 | * | 5/2006 |
| JP | H08-333137 A | | 12/1996 |
| JP | H11-292567 A | | 10/1999 |
| JP | 2005-330176 A | | 12/2005 |
| JP | 6468409 B1 | | 2/2019 |
| KR | 2014-0001656 A | | 1/2014 |

OTHER PUBLICATIONS

PCT/ISA/210 from International Application PCT/JP2023/020837 with the English.
PCT/ISA/237 from International Application PCT/JP2023/020837.

\* cited by examiner

*Primary Examiner* — Matthew E. Hoban
(74) *Attorney, Agent, or Firm* — Carrier, Shende & Associates P.C.; Joseph P. Carrier; Fulchand P. Shende

(57) ABSTRACT

A glass composition for glass fiber includes $Nb_2O_5$ of 0.0001 to 0.3500% by mass, and $SO_3$ of 0.0010 to 0.0100% by mass with respect to a total amount of the glass composition for glass fiber, wherein assuming that a rest of the total amount excluding $SO_3$ and $Nb_2O_5$ is 100 parts by mass, the glass composition for glass fiber includes $SiO_2$ of 48.0 to 60.0 parts by mass, $B_2O_3$ of 18.4 to 27.0 parts by mass, $Al_2O_3$ of 10.8 to 17.0 parts by mass, MgO of 0 to 2.5 parts by mass, CaO of 0. to 6.0 parts by mass, SrO of 0 to 4.5 parts by mass, $TiO_2$ of 0.5 to 3.5 parts by mass, and $F_2$ and $Cl_2$ of 0 to 2.5 parts by mass in total, and a ratio $SO_3/Nb_2O_5$ is 0.07 to 13.70.

3 Claims, No Drawings

GLASS COMPOSITION FOR GLASS FIBERS, GLASS FIBERS, GLASS FIBER TEXTILE, AND GLASS FIBER-REINFORCED RESIN COMPOSITION

TECHNICAL FIELD

The present invention relates to a glass composition for glass fiber, glass fiber, a glass fiber textile (also referred to as a glass fiber woven fabric), and a glass fiber-reinforced resin composition.

BACKGROUND ART

Conventionally, glass fiber has been widely used in various applications to improve the strength of resin molded products, and the resin molded products have been used for a housing or a part such as a printed wiring board of electronic devices such as a server, a smartphone, and a laptop computer, and the like.

In general, glass absorbs energy from alternating current as heat, and thus has a problem that the above resin molded product generates heat when the resin molded product is used for a housing or a part of the electronic devices.

Here, among transmission losses corresponding to communication signal attenuation, a dielectric loss absorbed by glass to generate heat is proportional to the square root of the dielectric constant and the dielectric loss tangent determined by the component and the structure of the glass, and is represented by the following formula (A):

$$W = kf \times \varepsilon^{1/2} \times \tan\delta \qquad (A)$$

wherein W is a dielectric loss, k is a constant, f is a frequency, s is a dielectric constant, and tan δ is a dielectric loss tangent. From the formula (A), it is found that the dielectric loss is larger and heat generation of the above resin molded product is larger as the dielectric constant and the dielectric loss tangent are larger, and as the frequency is higher.

In recent years, in response to the fact that the frequency (f in the above formula (A)) of the alternating current used in the above electronic device has increased, the glass fiber used for a housing or a part of the above electronic device has been required to have a lower dielectric constant and a lower dielectric loss tangent in order to reduce the dielectric loss.

As such glass fiber having a low dielectric constant and a low dielectric loss tangent, the present applicant has suggested a glass composition for glass fiber including $SiO_2$ in the range of 52.0 to 59.5% by mass, $B_2O_3$ in the range of 17.5 to 25.5% by mass, $Al_2O_3$ in the range of 9.0 to 14.0% by mass, SrO in the range of 0.5 to 6.0% by mass, MgO in the range of 1.0 to 5.0% by mass, CaO in the range of 1.0 to 5.0% by mass, and $F_2$ and $Cl_2$ in the range of 0.1 to 2.5% by mass in total, with respect to the total amount of the glass fiber (see Patent Literature 1).

CITATION LIST

Patent Literature

Patent Literature 1: Japanese Patent No. 6468409

SUMMARY OF INVENTION

Technical Problem

When glass fiber is used in a printed wiring board or the like, if a bubble remains in the glass fiber, the bubble can be a cause of cutting in spinning the fiber, or largely decrease reliability when the fiber is used in the printed wiring board and therefore, it is demanded to suppress mixture of a bubble in the glass fiber.

Usually, in order to produce glass fiber having no bubbles remaining therein, for E-glass fiber having an E-glass composition that is regarded as the most generally used glass composition, a bubble included in molten glass is removed by melting the glass at a melt temperature (for example, 100 poise temperature) higher than a spinning temperature, and the resultant is spun at the spinning temperature (1000 poise temperature), and thus, glass fiber including no bubbles remaining therein can be obtained.

In the production of the glass fiber having a low dielectric constant and a low dielectric loss tangent described in Patent Literature 1, however, differently from the E-glass fiber, even when the number of bubbles or the volume of bubbles included in the molten glass is sufficiently reduced by employing a temperature higher than the spinning temperature, a new bubble is unavoidably formed in reducing the temperature of the molten glass to the vicinity of the spinning temperature. Therefore, it is disadvantageously necessary to perform, after reducing the temperature of the molten glass to the vicinity of the spinning temperature, a process of melting the glass for a further longer time (which process will be hereinafter sometimes referred to as the defoam process).

In order to ensure the defoam process for a long time, the capacity of a melting tank for holding the molten glass for the defoam process needs to be large, and since the melting tank (melting furnace) is thus unnecessarily large, power necessary for the melting is large, which requires a large amount of furnace materials, and hence is uneconomical.

An object of the present invention is, by eliminating the disadvantage, to provide a glass composition for glass fiber with which glass fiber having a low dielectric constant and a low dielectric loss tangent can be obtained, and in addition, a time necessary for a defoam process can be reduced.

Besides, another object of the present invention is to provide glass fiber including a glass filament formed from the glass composition for glass fiber, a glass fiber woven fabric including the glass fiber, and a glass-fiber-reinforced resin composition including the glass fiber.

Solution to Problem

In order to achieve the objects, a glass composition for glass fiber of the present invention is a glass composition for glass fiber including $Nb_2O_5$ in a range of 0.0001 to 0.3500% by mass, and $SO_3$ in a range of 0.0010 to 0.0100% by mass with respect to a total amount of the glass composition for glass fiber, wherein assuming that a rest of the total amount of the glass composition for glass fiber excluding $SO_3$ and $Nb_2O_5$ is 100 parts by mass, the glass composition for glass fiber includes $SiO_2$ in a range of 48.0 to 60.0 parts by mass, $B_2O_3$ in a range of 18.4 to 27.0 parts by mass, $Al_2O_3$ in a range of 10.8 to 17.0 parts by mass. MgO in a range of 0 to 2.5 parts by mass, CaO in a range of 0. to 6.0 parts by mass, SrO in a range of 0 to 4.5 parts by mass, $TiO_2$ in a range of 0.5 to 3.5 parts by mass, and $F_2$ and $Cl_2$ in a range of 0 to 2.5 parts by mass in total, and a ratio of a content of $SO_3$ to a content of $Nb_2O_5$ ($SO_3/Nb_2O_5$) is in a range of 0.07 to 13.70.

According to the glass composition for glass fiber of the present invention, owing to the above-described composition, glass fiber having a low dielectric constant and a low dielectric loss tangent can be obtained, and in addition, even if a time necessary for a defoam process is reduced, mixture of a bubble in the glass fiber can be suppressed.

Here, that the glass fiber obtained from the glass composition for glass fiber of the present invention has a low dielectric constant means that the dielectric constant is 4.6 or less at a measurement frequency of 10 GHz, and that the glass fiber has a low dielectric loss tangent means that the dielectric loss tangent is 0.0024 or less at a measurement frequency of 10 GHz.

Besides, glass fiber of the present invention comprises a glass filament formed from the glass composition for glass fiber of the present invention, and a glass fiber woven fabric and a glass-fiber-reinforced resin composition of the present invention comprise the glass fiber of the present invention.

DESCRIPTION OF EMBODIMENT

Hereinafter, embodiments of the present invention will be described in detail.

A glass composition for glass fiber of the present embodiment is a glass composition for glass fiber including $Nb_2O_5$ in a range of 0.0001 to 0.3500% by mass, and $SO_3$ in a range of 0.0010 to 0.0100% by mass with respect to a total amount of the glass composition for glass fiber, wherein assuming that a rest of the total amount of the glass composition for glass fiber excluding $SO_3$ and $Nb_2O_5$ is 100 parts by mass, the glass composition for glass fiber includes $SiO_2$ in a range of 48.0 to 60.0 parts by mass, $B_2O_3$ in a range of 18.4 to 27.0 parts by mass. $Al_2O_3$ in a range of 10.8 to 17.0 parts by mass, MgO in a range of 0 to 2.5 parts by mass. CaO in a range of 0. to 6.0 parts by mass. SrO in a range of 0 to 4.5 parts by mass. $TiO_2$ in a range of 0.5 to 3.5 part, by mass, and $F_2$ and $Cl_2$ in a range of 0 to 2.5 parts by mass in total, and a ratio of a content of $SO_3$ to a content of $Nb_2O_5$ ($SO_3/Nb_2O_5$) is in a range of 0.07 to 13.70.

In the glass composition for glass fiber of the present embodiment, when the content of $Nb_2O_5$ with respect to the total amount of the glass composition for glass fiber is less than 0.0001% by mass, a clarifying effect in melting glass does not favorably work, and hence it is difficult to reduce the number of bubbles before lowering the temperature of molten glass. Besides, when the content of $Nb_2O_5$ with respect to the total amount of the glass composition for glass fiber is more than 0.3500% by mass, bubbles are excessively formed in the molten glass, and hence a defoam process needs to be performed for a longer time. Here, the clarifying effect means an effect in which a bubble formed in a glass-forming process from a batch integrates with a bubble probably formed in, for example, melting $Nb_2O_5$ into glass to become large, or is engulfed to emerge toward outside the molten glass, whereby accelerating defoam.

In the glass composition for glass fiber of the present embodiment, the content of $Nb_2O_5$ with respect to the total amount of the glass composition for glass fiber is preferably in the range of 0.1000% by mass or less, more preferably in the range of 0.0500% by mass or less, further preferably in the range of 0.0300/by mass or less, particularly preferably in the range of 0.0100% by mass or less, and most preferably in the range of 0.0010 to 0.0050% by mass.

In the glass composition for glass fiber of the present embodiment, when the content of $SO_3$ with respect to the total amount of the glass composition for glass fiber is less than 0.0010% by mass, the clarifying effect in melting glass is excessively small, and hence a larger number of bubbles remain before lowering the temperature of the molten glass. As a result, the defoam process needs to be performed for a longer time, and in addition, the number of bubbles is not sufficiently reduced even through the defoam process. Besides, when the content of $SO_3$ with respect to the total amount of the glass composition for glass fiber is more than 0.0100°/b by mass, the number of new bubbles formed in lowering the temperature is excessively increased, and hence the defoam process needs to be performed for a longer time.

In the glass composition for glass fiber of the present embodiment, the content of $SO_3$ with respect to the total amount of the glass composition for glass fiber is preferably in the range of 0.0020 to 0.0080% by mass or less, more preferably in the range of 0.0035 to 0.0070% by mass, and most preferably in the range of 0.0040 to 0.0050% by mass.

In the glass composition for glass fiber of the present embodiment, when the ratio of the content of $SO_3$ to the content of $Nb_2O_5$ ($SO_3/Nb_2O_5$) is less than 0.07, bubble formation of $Nb_2O_5$ is excessively vigorous in increasing the temperature of the molten glass, and hence the defoam process needs to be performed for a longer time. When the ratio of the content of $SO_3$ to the content of $Nb_2O_5$ ($SO_3/Nb_2O_5$) is more than 13.70, bubble formation of $SO_3$ in lowering the temperature of the molten glass cannot be suppressed, and hence the defoam process needs to be performed for a longer time.

In the glass composition for glass fiber of the present embodiment, assuming that the rest of the total amount excluding $SO_3$ and $Nb_2O_5$ is 100 parts by mass, when the content of $SiO_2$ is less than 48.0 parts by mass, the mechanical strength of glass fiber obtained from the glass composition for glass fiber is greatly reduced, and the function of the glass fiber as a reinforcing material in a glass fiber-reinforced resin composition is impaired. On the other hand, when the content of $SiO_2$ is more than 60.0 parts by mass, the viscosity at a high temperature increases. Thus, the temperature at which a glass raw material is melted rises, and from the viewpoint of production cost, the glass composition for glass fiber of the present embodiment will be not suitable for industrial glass fiber production.

In the glass composition for glass fiber of the present embodiment, assuming that the rest of the total amount excluding $SO_3$ and $Nb_2O_5$ is 100 parts by mass, the content of $SiO_2$ is preferably in the range of 51.1 to 56.9 parts by mass, more preferably in the range of 52.1 to 55.9 parts by mass, further preferably in the range of 52.4 to 55.2 parts by mass, particularly preferably in the range of 52.7 to 54.5 pacts by mass, and most preferably in the range of 53.0 to 54.4 parts by mass.

In the glass composition for glass fiber of the present embodiment, assuming that the rest of the total amount excluding $SO_3$ and $Nb_2O_5$ is 100 parts by mass, when the content of $B_2O_3$ is less than 18.4 parts by mass, the dielectric loss tangent of the glass fiber obtained from the glass composition for glass fiber cannot be sufficiently reduced. On the other hand, when the content of $B_2O_3$ is more than 27.0 parts by mass, phase separation occurs in the glass fiber obtained from the glass composition for glass fiber, and the chemical durability of the glass fiber may decrease.

In the glass composition for glass fiber of the present embodiment, assuming that the rest of the total amount excluding $SO_3$ and $Nb_2O_5$ is 100 parts by mass, the content of $B_2O_3$ is preferably in the range of 19.4 to 25.5 parts by mass, more preferably in the range of 20.1 to 24.9 parts by mass, further preferably in the range of 20.7 to 24.4 parts by mass, still further preferably in the range of 21.6 to 24.2 parts by mass, particularly preferably in the range of 22.0 to 23.8 parts by mass, and most preferably in the range of 22.4 to 23.4 parts by mass.

In the glass composition for glass fiber of the present embodiment, assuming that the rest of the total amount excluding $SO_3$ and $Nb_2O_5$ is 100 parts by mass, when the content of $Al_2O_3$ is less than 10.8 parts by mass, phase separation occurs in the glass fiber obtained from the glass composition for glass fiber, and the chemical durability of the glass fiber may decrease. On the other hand, when the content of $Al_2O_3$ is more than 17.0 parts by mass, the dielectric loss tangent of the glass fiber obtained from the glass composition for glass fiber cannot be sufficiently reduced.

In the glass composition for glass fiber of the present embodiment, assuming that the rest of the total amount excluding $SO_3$ and $Nb_2O_5$ is 100 parts by mass, the content of $Al_2O_3$ is preferably in the range of 11.7 to 16.4 parts by mass, more preferably in the range of 12.1 to 15.9 pacts by mass, further preferably in the range of 12.6 to 15.4 parts by mass, particularly preferably in the range of 12.9 to 14.9% by mass, and most preferably in the range of 13.2 parts by mass to 14.7 parts by mass.

In the glass composition for glass fiber of the present embodiment, assuming that the rest of the total amount excluding $SO_3$ and $Nb_2O_5$ is 100 parts by mass, when the content of MgO is more than 2.5 parts by mass, striae occur in a melt of the glass composition for glass fiber, and cut of glass fiber during spinning may easily occur.

In the glass composition for glass fiber of the present embodiment, assuming that the rest of the total amount excluding $SO_3$ and $Nb_2O_5$ is 100 parts by mass, when the content of MgO is preferably in the range of 0.1 to 2.3 parts by mass, crystallization of the glass can be suppressed, and the liquid phase temperature can be inhibited from increasing to sufficiently ensure a working temperature range. In the glass composition for glass fiber of the present embodiment, assuming that the rest of the total amount excluding $SO_3$ and $Nb_2O_5$ is 100 parts by mass, the content of MgO is more preferably in the range of 0.2 to 2.0 parts by mass, further preferably in the range of 1.9 parts by mass or less, still further preferably in the range of 0.3 to 1.2 parts by mass, particularly preferably in the range of 0.5 to 1.1 parts by mass, still more preferably in the range of 0.5 to 0.9 parts by mass, and most preferably in the range of 0.7 to 0.95 parts by mass.

In the glass composition for glass fiber of the present embodiment, assuming that the rest of the total amount excluding $SO_3$ and $Nb_2O_5$ is 100 parts by mass, when the content of CaO is more than 6.0 parts by mass, the dielectric loss tangent of the glass fiber obtained from the glass composition for glass fiber cannot be sufficiently reduced.

In the glass composition for glass fiber of the present embodiment, assuming that the rest of the total amount excluding $SO_3$ and $Nb_2O_5$ is 100 parts by mass, when the content of CaO is preferably in the range of 0.5 to 5.8 parts by mass, crystallization of glass can be suppressed, and an electrical resistance value of the molten glass at a high temperature can be reduced. In the glass composition for glass fiber of the present embodiment, assuming that the rest of the total amount excluding SOS and $Nb_2O_5$ is 100 parts by mass, the content of CaO is preferably in the range of 0.5 to 5.8 parts by mass, more preferably in the range of 1.0 to 5.5 parts by mass, further preferably in the range of 2.0 to 5.3 parts by mass, still further preferably in the range of 2.8 to 5.1 parts by mass, particularly preferably in the range of 3.2 to 4.9 parts by mass, and most particularly preferably in the range of 3.5 to 4.8 parts by mass.

In the glass composition for glass fiber of the present embodiment, assuming that the rest of the total amount excluding $SO_3$ and $Nb_2O_5$ is 100 parts by mass, when the content of SrO is more than 4.5 parts by mass, the dielectric characteristics of the glass fiber obtained from the glass composition for glass fiber deteriorate, and target dielectric characteristics cannot be satisfied.

In the glass composition for glass fiber of the present embodiment, assuming that the rest of the total amount excluding $SO_3$ and $Nb_2O_5$ is 100 parts by mass, the content of SrO is preferably in the range of 3.1 parts by mass or less, more preferably in the range of 2.9 parts by mass or less, further preferably in the range of 2.5 parts by mass or less, particularly preferably in the range of 2.3 parts by mass or less, and most preferably in the range of 2.1 parts by mass or less, and thus, the dielectric loss tangent of the glass fiber to be obtained can be reduced. On the other hand, in the glass composition for glass fiber of the present embodiment, assuming that the rest of the total amount excluding $SO_3$ and $Nb_2O_5$ is 100 parts by mass, the content of SrO is preferably in the range of 0.1 parts by mass or more. Besides, in the glass composition for glass fiber of the present embodiment, assuming that the rest of the total amount excluding $SO_3$ and $Nb_2O_5$ is 100 parts by mass, the content of SrO is more preferably in the range of 0.5 parts by mass or more, further preferably in the range of 0.8 parts by mass or more, particularly preferably in the range of 1.2 parts by mass or more, and most preferably in the range of 1.5 parts by mass or more, and thus, the glass fiber can be easily formed into a long filament.

In the glass composition for glass fiber, assuming that the rest of the total amount excluding $SO_3$ and $Nb_2O_5$ is 100 parts by mass, when the content of $TiO_2$ is less than 0.5 parts by mass, the viscosity at a high temperature increases. Thus, the temperature at which a glass raw material is melted rises, and from the viewpoint of production cost, the glass composition for glass fiber will be not suitable for industrial glass fiber production. On the other hand, when the content of $TiO_2$ is more than 3.5 parts by mass, the dielectric loss tangent of the glass fiber obtained from the glass composition for glass fiber cannot be sufficiently reduced, and the liquid phase temperature of the glass composition for glass fiber greatly increases. Thus, stable manufacturing of glass fiber cannot be conducted.

In the glass composition for glass fiber of the present embodiment, assuming that the rest of the total amount excluding $SO_3$ and $Nb_2O_5$ is 100 parts by mass, the content of $TiO_2$ is preferably in the range of 0.7 to 3.2 parts by mass, more preferably in the range of 0.9 to 2.7 parts by mass, and further preferably in the range of 1.2 to 2.5 parts by mass. In the glass composition for glass fiber of the present embodiment, assuming that the rest of the total amount excluding $SO_3$ and $Nb_2O_5$ is 100 parts by mass, when the content of $F_2$ and $Cl_2$ in total is more than 2.5 parts by mass, the chemical durability of the glass fiber obtained from the glass composition for glass fiber decreases.

In the glass composition for glass fiber of the present embodiment, assuming that the rest of the total amount excluding $SO_3$ and $Nb_2O_5$ is 100 parts by mass, when the content of $F_2$ and $Cl_2$ in total is preferably 0.1 parts or more, the viscosity at a high temperature is reduced, and the dielectric characteristics of the glass are improved, and thus, the dielectric constant and the dielectric loss tangent can be reduced. In the glass composition for glass fiber of the present embodiment, assuming that the rest of the total amount excluding $SO_3$ and $Nb_2O_5$ is 100 parts by mass, the content of $F_2$ and $Cl_2$ in total is preferably in the range of 0.1 to 2.2 parts by mass, more preferably in the range of 0.3 to 1.9 parts by mass, further preferably in the range of 0.5 to 1.6 parts by mass, and particularly preferably in the range of 0.6 to 1.4 parts by mass.

In the glass composition for glass fiber of the present embodiment, when the content of CL to the content of $F_2$ is preferably in the range of 1.0% or less, and more preferably in the range of 0.1% or less, bubble formation in the defoam process tends to be suppressed to further reduce the time necessary for the defoam process.

Assuming that the rest of the total amount excluding $SO_3$ and $Nb_2O_5$ is 100 parts by mass, the glass composition for glass fiber of the present embodiment may include $Na_2O$, $K_2O$, and $Li_2O$ in total in the range of less than 1.00 part by mass. When the glass composition for glass fiber of the present embodiment includes $Na_2O$, $K_2O$, and $Li_2O$. if the total content of these is more than 1.00 part by mass, the dielectric characteristics of the glass fiber obtained from the glass composition for glass fiber greatly deteriorate, and target dielectric characteristics cannot be achieved.

Assuming that the rest of the total amount excluding $SO_3$ and $Nb_2O_5$ is 100 parts by mass, when the glass composition for glass fiber of the present embodiment includes $Na_2O$, $K_2O$, and $Li_2O$, the total content of these is preferably in the range of less than 0.80 parts by mass, more preferably in the range of less than 0.50 parts by mass, further preferably in the range of less than 0.20 parts by mass, particularly preferably in the range of less than 0.10 parts by mass, and most preferably in the range of less than 0.05 parts by mass with respect to the total amount of the glass composition for glass fiber.

Assuming that the rest of the total amount excluding $SO_3$ and $Nb_2O_5$ is 100 pacts by mass, the glass composition for glass fiber of the present embodiment may include ZnO in the range of 0 to 3.00 parts by mass. When the glass composition for glass fiber of the present embodiment includes ZnO, and the content of ZnO is more than 3.00 parts by mass, a devitrified product tends to occur during spinning of the glass fiber obtained from the glass composition for glass fiber, stable glass fiber manufacturing cannot be conducted, and the dielectric characteristics of the glass fiber deteriorate.

When the glass composition for glass fiber of the present embodiment includes ZnO, assuming that the rest of the total amount excluding $SO_3$ and $Nb_2O_5$ is 100 parts by mass, the content of ZnO is preferably in the range of 2.50 parts by mass or less, more preferably in the range of 1.50 parts by mass or less, further preferably in the range of 0.50 parts by mass or less, particularly preferably in the range of 0.10 parts by mass or less, and most preferably in the range of less than 0.01 parts by mass.

Assuming that the rest of the total amount excluding $SO_3$ and $Nb_2O_5$ is 100 parts by mass, the glass composition for glass fiber of the present embodiment may include $P_2O_5$ in the range of less than 4.00 parts by mass. When the glass composition for glass fiber of the present embodiment includes $P_2O_5$, assuming that the rest of the total amount excluding $SO_3$ and $Nb_2O_5$ is 100 parts by mass, if the content of $P_2O_5$ is 4.00 parts by mass or more, phase separation of the glass fiber obtained from the glass composition for glass fiber cannot be suppressed, and thus the water resistance deteriorates.

When the glass composition for glass fiber of the present embodiment includes $P_2O_5$, assuming that the rest of the total amount excluding $SO_3$ and $Nb_2O_5$ is 100 parts by mass, the content of $P_2O_5$ is preferably in the range of 3.0 parts by mass or less, more preferably in the range of 2.50 parts by mass or less, further preferably in the range of 1.50 parts by mass or less, still more preferably in the range of 0.40 parts by mass or less, particularly preferably in the range of 0.10 parts by mass or less, and most preferably in the range of less than 0.01 parts by mass.

Assuming that the rest of the total amount excluding $SO_3$ and $Nb_2O_5$ is 100 parts by mass, the glass composition for glass fiber of the present embodiment may include $Fe_2O_3$ in the range of 0 to 1.00 part by mass. When the glass composition for glass fiber of the present embodiment includes $Fe_2O_3$, it is effective to set the content of $Fe_2O_3$ to the range of 0.05 to 0.60 parts by mass from the viewpoint of suppressing a bubble included in the glass fiber.

Assuming that the rest of the total amount excluding $SO_3$ and $Nb_2O_5$ is 100 parts by mass, the glass composition for glass fiber of the present embodiment may include $SnO_2$ in the range of 0 to 1.00 part by mass. When the glass composition for glass fiber of the present embodiment includes $SnO_2$, it is effective to set the content of $SnO_2$ to the range of 0.05 to 0.60 parts by mass from the viewpoint of suppressing a bubble included in the glass fiber.

Assuming that the rest of the total amount excluding $SO_3$ and $Nb_2O_5$ is 100 parts by mass, the glass composition for glass fiber of the present embodiment may include $MnO_2$ in the range of 0 to 3.00 parts by mass. When the glass composition for glass fiber of the present embodiment includes $MnO_2$, if the content of $MnO_2$ is more than 3.00 parts by mass, the dielectric characteristics of the glass fiber obtained from the glass composition for glass fiber deteriorate, and desired dielectric characteristics cannot be obtained.

When the glass composition for glass fiber of the present embodiment includes $MnO_2$, assuming that the rest of the total amount excluding $SO_3$ and $Nb_2O_5$ is 100 parts by mass, the content of $MnO_2$, is preferably in the range of 2.50 parts by mass or less, more preferably in the range of 1.50 parts by mass or less, and further preferably in the range of 0.50 parts by mass or less.

Assuming that the rest of the total amount excluding $SO_3$ and $Nb_2O_5$ is 100 pacts by mass, the glass composition for glass fiber of the present embodiment may include $ZrO_2$ in the range of less than 0.60 parts by mass. When the glass composition for glass fiber of the present embodiment includes $ZrO_2$, assuming that the rest of the total amount excluding $SO_3$ and $Nb_2O_5$ is 100 parts by mass, the content of $ZrO_2$ is preferably in the range of less than 0.60 parts by mass, more preferably in the range of less than 0.45 parts by mass, further preferably in the range of less than 0.40 parts by mass, still more preferably in the range of less than 0.20 parts by mass, particularly preferably in the range of less than 0.10 parts by mass, and most preferably in the range of less than 0.05 parts by mass.

Assuming that the rest of the total amount excluding $SO_3$ and $Nb_2O_5$ is 100 parts by mass, the glass composition for glass fiber of the present embodiment may include $Cr_2O_3$ in the range of less than 0.05 parts by mass. When the glass composition for glass fiber of the present embodiment includes $Cr_2O_3$, assuming that the rest of the total amount excluding $SO_3$ and $Nb_2O_5$ is 100 parts by mass, and the content of $Cr_2O_3$ is 0.05 parts by mass or more, a do vitrified product tends to occur during spinning of the glass fiber obtained from the glass composition for glass fiber, and stable glass fiber manufacturing cannot be conducted.

The glass composition for glass fiber of the present embodiment may include, as impurities attributable to raw materials, oxides of Ba, Co, Ni, Cu, Mo, W, Ce, Y, La, Bi, Gd, Pr, Sc, or Yb in the range of less than 3.00 parts by mass in total assuming that the rest of the total amount excluding $SO_3$ and $Nb_2O_5$ is 100 parts by mass, and the content is preferably less than 2.00 parts by mass, and more preferably less than 1.00 part by mass. Particularly when the glass composition for glass fiber of the present embodiment includes $BaO$, $CeO_2$, $Y_2O_3$, $La_2O_3$, $Bi_2O_3$, $Gd_2O_3$, $Pr_2O_3$, $Sc_2O_3$, or $Yb_2O_3$ as impurities, the contents thereof are independently preferably in the range of less than 0.40 parts by mass, more preferably in the range of less than 0.20 parts by mass, further preferably in the range of less than 0.10 parts by mass, particularly preferably in the range of less than 0.05 parts by mass, and most preferably in the range of less than 0.01 parts by mass.

In the glass composition for glass fiber of the present embodiment, assuming that the rest of the total amount excluding $SO_3$ and $Nb_2O_5$ is 100 parts by mass, the content of $SiO_2$, $B_2O_3$, $Al_2O_3$, $MgO$, $CaO$, $SrO$, $TiO_2$, $F_2$, and $Cl_2$ in total with respect to the total amount is, for example, in the range of 91.0 parts by mass or more, preferably in the range of 95.0 parts by mass or more, more preferably in the range of 98.0 parts by mass or more, further preferably in the range of 99.0 parts by mass or more, still further preferably in the range of 99.3 parts by mass or more, particularly preferably in the range of 99.5 parts by mass or more, more particularly preferably in the range of 99.7 parts by mass or more, and most preferably in the range of 99.9 parts by mass or more.

Regarding the content of each component described above in the glass composition for glass fiber of the present embodiment, the content of Li as a light element can be measured with an ICP emission spectroscopic analyzer, and the contents of the other elements can be measured with a wavelength dispersive X-ray fluorescence analyzer.

The measurement method is as follows. First, a glass batch (prepared by mixing glass raw materials), or glass fiber is placed in a platinum crucible, and in an electric furnace, specifically the glass batch is placed in a platinum crucible with a diameter of 80 mm, the temperature is increased from room temperature up to 1650° C. at a rate of 10° C./min, and the glass batch is melted at a temperature of 1650° C. for 2 hours, and then, the temperature is lowered to 1450° C. at a temperature decrease rate of 10° C./mm, and the resultant is held for 10 minutes to obtain homogenous molten glass. At this point, when an organic matter adheres to the surface of the glass fiber, or when glass fiber is mainly included as a reinforcing material in an organic matter (resin), the glass fiber is used after removing the organic matter by, for example, heating for about 0.5 to 24 hours in a muffle furnace at a temperature of 300 to 650° C.

Next, the obtained molten glass is poured onto a carbon plate to produce a glass culler, and then pulverized and powdered into a glass powder. Regarding Nb and S. the resulting glass powder is molded into a disc shape by a pressing machine, and then measurement is conducted using a wavelength dispersive X-ray fluorescence analyzer by the fundamental parameter method. Regarding the other elements excluding Nb and S, the content of each component is analyzed by a method described below, and the contents of the respective components are calculated so that the content of the rest excluding $Nb_2O_5$ and $SO_3$ can be 100 parts by mass, and based on the thus obtained numerical values, the contents of the above-described components can be obtained.

For analysis of the content of the elements excluding Nb and S, regarding Li as the light element, the resulting glass powder is thermally decomposed with an acid, and then quantitatively analyzed using an ICP emission spectroscopic analyzer. Regarding other elements, the glass powder is molded into a disc shape by a pressing machine and then quantitatively analyzed using a wavelength dispersive X-ray fluorescence analyzer. For the quantitative analysis using a wavelength dispersive X-ray fluorescence analyzer, specifically, specimens for calibration curve are prepared based on the measurement results from the fundamental parameter method, and the analysis can be performed by the calibration curve method. The content of each component in the specimens for calibration curve can be quantitatively analyzed by an ICP emission spectroscopic analyzer.

The glass composition for glass fiber of the present embodiment has a dielectric constant at a measurement frequency of 10 GHz of preferably in the range of 4.6 or less, and more preferably in the range of 4.4 or less. The lower limit is not especially limited, and is preferably in the range of 3.7 or more.

The glass composition for glass fiber of the present embodiment has a dielectric loss tangent at a measurement frequency of 10 GHz of preferably in the range of 0.0024 or less, more preferably in the range of 0.0021 or less, and further preferably in the range of 0.0019 or less. The lower limit is not especially limited, and is preferably in the range of 0.0008 or more.

The glass composition for glass fiber of the present embodiment can be obtained by melting a glass raw material prepared to have the above composition after melt-solidification (glass batch) and then cooling to be solidified.

When the glass fiber of the present embodiment is to be formed from the glass composition for glass fiber of the present embodiment, at first, the glass raw material prepared as described above is supplied to a glass melting furnace, and is melted in a melting temperature range higher than the spinning temperature, specifically at a temperature in the range of 1510 to 1700° C. Subsequently, the molten glass having been melted at the temperature is supplied to a melting tank controlled to a spinning temperature range, specifically a temperature in the range of 1300 to 1500° C. Next, the resultant is held in the melting tank during the defoam process, namely, during a time period in the range of 5 minutes to 96 hours, to eliminate a bubble included in the molten glass. The time of the defoam process is preferably in the range of 5 minutes or more and less than 30 minutes, and more preferably in the range of 5 minutes or more and less than 10 minutes. Then, the resultant molten glass is discharged through nozzle tips or holes in a number ranging from 1 to 8000, and cooled while stretched by winding at high speed to be solidified into glass fiber.

Glass single fiber (glass filament) discharged from one nozzle tip or hole, cooled and solidified typically has a perfect circle cross-sectional shape and has a diameter in the range of 3.0 to 35.0 μm. In applications that require low dielectric properties, the glass filament preferably has a diameter in the range of 3.0 to 6.0 μm and more preferably a diameter in the range of 3.0 to 4.5 μm. On the other hand, when the above nozzle tip has a non-circular shape and has a protrusion or a notch for rapidly cooling the molten glass, controlling the temperature condition can provide a glass filament having a non-circular (for example, elliptical and long-oval) cross-sectional shape. When the glass filament has an elliptical or long-oval cross-sectional shape, the ratio of the major axis to the minor axis of the cross-sectional shape (major axis/minor axis) is, for example, in the range of 2.0 to 10.0 and the fiber diameter (converted fiber diameter) when the cross-sectional area is converted to a perfect circle is in the range of 3.0 to 35.0 µm.

The glass fiber of the present embodiment typically has a shape of a glass fiber bundle (glass strand) in which the glass filaments in a number ranging from 10 to 8000 are bundled, and has a weight in the range of 1 to 10000 tex (g/km). Glass filaments discharged from a plurality of nozzle tips or holes may be bundled into one glass fiber bundle or may be bundled into a plurality of glass fiber bundle.

The glass fiber of the present embodiment can have various forms, which are obtained by further processing the above glass strands, such as yarns, woven fabrics, knitted fabrics, non-woven fabrics (including chopped strand mats and multiaxial non woven Fabrics), chopped strands, ravings, and powders.

The glass fiber of the present embodiment may be coated with an organic matter on the surface thereof for the purposes such as improvement of glass filament convergence, improvement of adhesiveness between glass fiber and a resin, and improvement of uniform dispersibility of glass fiber in a mixture of glass fiber and resin or inorganic material. Examples of such an organic matter can include starch, urethane resins, epoxy resins, vinyl acetate resins, acrylic resins, modified polypropylene (particularly carboxylic acid-modified polypropylene), and a copolymer of (poly)carboxylic acid (particularly maleic acid) and an unsaturated monomer. The glass fiber of the present embodiment may be coated with the resin composition including a silane coupling agent, a lubricant, surfactant, and the like in addition to these resins. The glass fiber of the present embodiment may be coated with the treating agent composition not including the above resins and including a silane coupling agent, surfactant, and the like. Such a resin composition or treating agent composition covers the glass fiber at a rate in the range of 0.03 to 2.0% by mass based on the mass of the glass fiber of the present embodiment in a state where it is not coated with the resin composition or the treating agent composition. The glass fiber can be coated with an organic matter by applying a resin solution or a resin composition solution to the glass fiber using a known method such as a roller applicator, for example, in the manufacturing process of the glass fiber and then drying the glass fiber to which the resin solution or the resin composition solution is applied. Alternatively, the glass fiber can be coated with an organic matter by immersing the glass fiber of the present embodiment in the form of a woven fabric in the treating agent composition solution, and then drying the resultant glass fiber to which the treating agent composition is applied.

Here, examples of the silane coupling agent include aminosilanes, chlorosilanes, epoxysilane, mercaptosilanes, vinylsilanes. and (meth)acrylsilanes. In the present embodiment, the silane coupling agents may be used singly or in combination of two or more.

Examples of the aminosilane include γ-aminopropyltriethoxysilane, N-β-(aminoethyl)-γ-aminopropyltrimethoxysilane, N-β-(aminoethyl)-N-β-(aminoethyl)-γ-aminopropyltrimethoxysilane, and γ-anilinopropyltrimethoxysilane.

Examples of the chlorosilane include γ-chloropropyltrimethoxysilane.

Examples of the epoxysilane include β-(3,4-epoxycyclohexyl)ethyltrimethoxysilane and γ-glycidoxypropyltrimethoxysilane.

Examples of the mercaptosilane can include γ-mercaptotrimethoxysilane.

Examples of the vinylsilane include vinyl trimethoxysilane and N-β-(N-vinylbenzylaminoethyl)-γ-aminopropyltrimethoxysilane.

Examples of the (meth)acrylsilane include γ-methacryloxypropyltrimethoxysilane.

Examples of the lubricant include modified silicone oils, animal oils and hydrogenated products thereof, vegetable oils and hydrogenated products thereof, animal waxes, vegetable waxes, mineral waxes, condensates of a higher saturated fatty acid and a higher saturated alcohol, polyethyleneimine, polyalkylpolyamine alkylamide derivatives, fatty acid anodes, and quaternary ammonium salts. In the present embodiment, the lubricants may be used singly or in combination of two or more.

Examples of the animal oil include beef tallow.

Examples of the vegetable oil include soybean oil, coconut oil, rapeseed oil, palm oil, and castor oil.

Examples of the animal wax include beeswax and lanolin.

Examples of the vegetable wax include candelilla wax and caranuba wax.

Examples of the mineral wax include paraffin wax and montan wax.

Examples of the condensate of a higher saturated fatty acid and a higher saturated alcohol include stearates such as lauryl stearate.

Examples of the fatty acid amide include dehydrated condensates of a polyethylenepolyamine such as diethylenetriamine, triethylenetetramine, or tetraethylenepentamine and a fatty acid such as lauric acid, myristic acid, palmitic acid, or stearic acid.

Examples of the quaternary ammonium salt include alkyltrimethylammonium salts such as lauryltrimethylammonium chloride.

Examples of the surfactant can include nonionic surfactants. cationic surfactants, anionic surfactants. and amphoteric surfactants. In the present embodiment, the surfactants may be used singly or in combination of two or more.

Examples of the nonionic surfactant can include ethylene oxide propylene oxide alkyl ether, polyoxyethylene alkyl ether, polyoxyethylene-polyoxypropylene-block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adduct, polyoxyethylene castor oil ether, hydrogenated castor oil ethylene oxide adduct, alkylamine ethylene oxide adduct, fatty acid amide ethylene oxide adduct. glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of the cationic surfactant can include alkyldimethylbenzylammonium chloride, alkyltrimethylammonium chloride, alkyl dimethyl ethyl ammonium ethyl sulfate, higher alkylamine salts, adduct of ethylene oxide to a higher alkylamine. condensate of a higher fatty acid and polyalkylene polyamine, a salt of an ester of a higher fatty acid and alkanolamine, a salt of higher fatty acid amide, imidazoline cationic surfactant, and alkyl pyridinium salt. Examples of the higher alkylamine salts include acetate and hydrochloride.

Examples of the anionic surfactant can include higher alcohol sulfate salts, higher alkyl ether sulfate salts, α-olefin sulfate salts, alkylbenzene sulfonate salts, α-olefin sulfonate salts, reaction products of fatty acid halide and N-methyl taurine, dialkyl sulfosuccinate salts, higher alcohol phosphate ester salts, and phosphate ester salts of higher alcohol ethylene oxide adduct.

Examples of the amphoteric surfactant include an amino acid amphoteric surfactant, a betaine amphoteric surfactant, and an imidazoline amphoteric surfactant. Examples of the amino acid amphoteric surfactant include alkali metal salts of alkylaminopropionic acid. An example of the betaine amphoteric surfactant includes alkyldimethylbetaine.

The glass fiber woven fabric of the present embodiment includes the above glass fiber of the present embodiment. Specifically, the glass fiber woven fabric of the present embodiment can be obtained by weaving the above glass fiber of the present embodiment as at least a part of warp yarns or weft yarns with a loom known per se. Examples of the loom may include jet looms such as air jet or water jet looms, shuttle looms, and rapier looms. Examples of weaving with the loom may include plain weaving, satin weaving, mat weaving, and twill weaving. From the viewpoint of production efficiency, plain weaving is preferred. In the glass fiber woven fabric of the present embodiment, the above glass fiber of the present embodiment is preferably used as warp yarns and weft yarns.

In the glass fiber woven fabric of the present embodiment, it is preferable that the glass fiber of the present embodiment is formed by bundling glass filaments in a number ranging from 35 to 400, each having a filament diameter in the range of 3.0 to 9.0 μm, has a number of twists in the range of 0 to 1.0 twist/25 mm, and has a mass in the range of 0.9 to 69.0 tex (gi 1000 m).

In the glass fiber woven fabric of the present embodiment, when the above glass fiber of the present embodiment is employed as warp yarns or weft yarns, the warp yarn weaving density is preferably in the range of 40 to 120 yarns/25 mm, and the weft yarn weaving density is preferably in the range of 40 to 120 yarns/25 mm.

The glass fiber woven fabric of the present embodiment, after woven, may be subjected to desizing treatment, surface treatment, and opening treatment.

An example of the desizing treatment includes a treatment in which the glass fiber woven fabric is placed in a heating oven having an atmosphere temperature in the range of 350 to 400° C. for a time period in the range of 40 to 80 hours for pyrolytically decomposing an organic matter adhering to the glass fiber.

An example of the surface treatment can be a treatment including immersing the glass fiber woven fabric in a solution including the silane coupling agent or including the silane coupling agent and the surfactant, squeezing extra water therefrom, and heat-drying the woven fabric at a temperature in the range of 80 to 180° C. for a time period in the range of 1 to 30 minutes.

An example of the opening treatment is a treatment in which the warp yarns of the glass fiber woven fabric are subjected to opening by means of water flow pressure, opening by means of high-frequency vibration using a liquid as a medium, opening by means of the pressure of a fluid having a surface pressure, opening by means of pressing with a roll, or the like under a tension in the range of 30 to 200 N to they widen the width of the warp yarns and weft yarns.

The glass fiber woven fabric of the present embodiment has a mass in the range of 7.0 to 190.0 $g/m^2$ and preferably has a thickness in the range of 8.0 to 200.0 μm.

The yarn width of the warp yarns of the glass fiber woven fabric of the present embodiment is preferably in the range of 110 to 600 μm and the yarn width of the weft yarns thereof is preferably in the range of 110 to 600 μm.

The glass fiber woven fabric of the present embodiment may comprise a surface treatment layer including the silane coupling agent or the silane coupling agent and the surfactant. When the glass fiber woven fabric of the present embodiment includes the surface treatment layer, the surface treatment layer can have a mass in the range of 0.03 to 1.50% by mass, for example, with respect to the total amount of the glass fiber woven fabric including the surface treatment layer.

The glass fiber-reinforced resin composition of the present embodiment includes the above glass fiber of the present embodiment. Specifically, the glass fiber-reinforced resin composition of the present embodiment includes in the range of 10 to 90% by mass of glass fiber with respect to the total amount of the glass fiber-reinforced resin composition, as the glass fiber-reinforced resin composition including thermoplastic resin or thermosetting resin, glass fiber, and other additives. The glass fiber-reinforced resin composition of the present embodiment includes a resin in the range of 90 to 10% by mass and includes other additives in the range of 0 to 40% by mass with respect to the total amount of the glass fiber-reinforced resin composition.

Examples of the above thermoplastic resin can include polyethylene, polypropylene, polystyrene, styrene/maleic anhydride resins, styrene/maleimide resins, polyacrylonitrile, acrylonitrile/styrene (AS) resins, acrylonitrile/butadiene/styrene (ABS) resins, chlorinated polyethylene, acrylonitrile/styrene (ACS) resins, acrylonitrile/ethylene/styrene (AES) resins, acrylonitrile/styrene/methyl acrylate (ASA) resins, styrene/acrylonitrile (SAN) resins, methacrylic resins, polyvinyl chloride (PVC), polyvinylidene chloride (PVDC), polyamide, polyacetal, polyethylene terephthalate (PET), polybutylene terephthalate (PBT), polytrimethylene terephthalate (PTT), polycarbonate, polyarylene sulfide, polyethersulfone (PES), polyphenylsulfone (PPSU), polyphenylene ether (PPE), modified polyphenylene ether (m-PPE), polyaryl etherketone, liquid crystal polymer (LCP), fluororesins, polyetherimide (PEI), polyarylate (PAR), polysulfone (PSF), polyamideimide (PA), polyaminobismaleimide (PABM), thermoplastic polyimide (TPI), polyethylene naphthalate (PEN), ethylene/vinyl acetate (EVA) resins, ionomer (IO) resins, polybutadiene, styrene/butadiene resins, polybutylene, polymethylpentene, olefin/vinyl alcohol resins, cyclic olefin resins, cellulose resins, and polylactic acid.

Specific examples of the polyethylene can include high density polyethylene (HDPE), medium density polyethylene, low density polyethylene (LDPE), linear low density polyethylene (LLDPE), and ultra high molecular weight polyethylene.

Examples of the polypropylene can include isotactic polypropylene, atactic polypropylene, syndiotactic polypropylene, and mixtures thereof.

Examples of the polystyrene can include general-purpose polystyrene (GPPS), which is an atactic polystyrene having an atactic structure, high impact polystyrene (HIPS) with a rubber component added to GPPS, and syndiotactic polystyrene with syndiotactic structure.

Examples of the methacrylic resin can include polymers obtained by homopolymerizing one of acrylic acid, methacrylic acid, styrene, methyl acrylate, ethyl acrylate, ethyl methacrylate, butyl acrylate, butyl methacrylate, and fatty acid vinyl ester, or polymers obtained by copolymerizing two or more of these.

Examples of the polyvinyl chloride can include a vinyl chloride homopolymer, a copolymer of a vinyl chloride monomer and a copolymerizable monomer, or a graft copolymer obtained by graft polymerization of a vinyl chloride monomer to polymer polymerized by a conventionally known method such as emulsion polymerization method, suspension polymerization method, micro suspension polymerization method, or bulk polymerization method.

Examples of the polyamide can include one of components such as polycaproamide (nylon 6), polyhexamethylene adipamide (nylon 66), polytetramethylene adipamide (nylon 46), polytetramethylene sebacamide (nylon 410), polypentamethylene adipamide (nylon 56), polypentamethylene sebacamide (nylon 510), polyhexamethylene sebacamide (nylon 610). polyhexamethylene dodecamide (nylon 612), polydecamethylene adipamide (nylon 106). polydecamethylene sebacamide (nylon 1010), polydecamethylene dodecamide (Nylon 1012), polyundecanamide (Nylon 11), polyundecamethylene adipamide (Nylon 116), polydodecanamide (Nylon 12), polyxylene adipamide (nylon XD6), polyxylene sebacamide (nylon XD10), polymetaxylylene adipamide (nylon MXD6), polyparaxylylene adipamide (nylon PXD6), polytetramethylene terephthalamide (nylon 4T), polypentamethylene terephthalamide (nylon 5T), polyhexamethylene terephthalamide (nylon 6T), polyhexamethylene isophthalamide (nylon 61), polynonamethylene terephthalamide (nylon 9T), polydecamethylene terephthalamide (nylon 10T), polyundecamethylene terephthalamide (nylon 11T), polydodecamethylene terephthalamide (nylon 12T), polytetramethylene isophthalamide (nylon 4I), polybis(3-methyl-4-aminohexyl) methane terephthalamide (nylon PACMT), polybis(3-methyl-4-aminohexyl) methane isophthalamide (nylon PACMI), polybis(3-methyl-4-aminohexyl) methane dodecamide (nylon PACM12), and polybis(3-methyl-4-aminohexyl) methane tetradecamide (nylon PACM14) or copolymers or mixtures of two or more of the components.

Examples of the polyacetal can include a homopolymer with oxymethylene units as the main repeating unit, and a copolymer mainly consisting of oxymethylene units and containing oxyalkylene units having 2 to 8 adjacent carbon atoms in the main chain.

Examples of the polyethylene terephthalate can include a polymer obtained by polycondensation of terephthalic acid or a derivative thereof with ethylene glycol.

Examples of the polybutylene terephthalate can include a polymer obtained by polycondensation of terephthalic acid or a derivative thereof with 1,4-butanediol.

Examples of the polytrimethylene terephthalate can include polymers obtained by polycondensation of terephthalic acid or a derivative thereof with 1,3-propandiol.

Examples of the polycarbonate can include polymers obtained by a transesterification method in which a dihydroxydiaryl compound is reacted with a carbonate such as diphenyl carbonate in a molten state; or polymers obtained by phosgene method in which a dihydroxyaryl compound is reacted with phosgene.

Examples of the polyarylene sulfide can include linear polyphenylene sulfide, cross linked polyphenylene sulfide having a high molecular weight obtained by performing a curing reaction after polymerization, polyphenylene sulfide sulfone, polyphenylene sulfide ether, and polyphenylene sulfide ketone.

Examples of the polyphenylene ether can include poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly[2(4'-methylphenyl)-1,4-phenylene ether], poly(2-bromo-6-phenyl-1,4-phenylene ether), poly(2-methyl-6-phenyl-1,4-phenylene ether), poly(2-phenyl-1,4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether), and poly(2,6-dimethyl-1,4-phenylene ether).

Examples of the modified polyphenylene ether can include: a polymer alloy of poly(2,6-dimethyl-1,4-phenylene)ether and polystyrene; a polymer alloy of poly(2,6-dimethyl-1,4-phenylene) ether and a styrene/butadiene copolymer; a polymer alloy of poly(2,6-dimethyl-1,4-phenylene)ether and a styrene/maleic anhydride copolymer; a polymer alloy of poly(2,6-dimethyl-1,4-phenylene)ether and polyamide; a polymer alloy of poly(2,6-dimethyl-1,4-phenylene)ether and styrene/butadiene/acrylonitrile copolymer; one obtained by introducing a functional group such as an amino group, an epoxy group, a carboxy group, a styryl group, or the like at the polymer chain end of the polyphenylene ether, and one obtained by introducing a functional group such as an amino group, an epoxy group, a carboxy group, a styryl group, a methacryl group, or the like at the polymer chain side chain of the polyphenylene ether.

Examples of the polyaryl etherketone can include polyetherketone (PEK), polyetheretherketone (PEEK), polyetherketoneketone (PEKK), and polyetheretherketoneketone (PEEKK).

Examples of the liquid crystal polymer (LCP) include a polymer (copolymer) consisting of one or more structural units selected from an aromatic hydroxycarbonyl unit which is thermotropic liquid crystal polyester, an aromatic dihydroxy unit, an aromatic dicarbonyl unit, an aliphatic dihydroxy unit, an aliphatic dicarbonyl unit, and the like.

Examples of the fluororesin can include polytetrafluoroethylene (PTFE), perfluoroalkoxy resins (PFA), fluorinated ethylene propylene resins (FEP), fluorinated ethylene tetrafluoroethylene resins (ETFE), polyvinyl fluoride (PVF), polyvinylidene fluoride (PVDF), polychlorotrifluoroethylene (PCTFE), and ethylene/chlorotrifluoroethylene resin (ECTFE).

Examples of the ionomer (IO) resin can include copolymers of an olefin or a styrene and an unsaturated carboxylic acid, wherein a part of carboxyl groups is neutralized with a metal ion.

Examples of the olefin/vinyl alcohol resin can include ethylene/vinyl alcohol copolymers, propylene/vinyl alcohol copolymers, saponified products of ethylene/vinyl acetate copolymers, and saponified products of propylene/vinyl acetate copolymers.

Examples of the cyclic olefin resin can include monocyclic compounds such as cyclohexene, polycyclic compounds such as tetracyclopentadiene, and polymers of cyclic olefin monomers.

Examples of the polylactic acid can include poly-L-lactic acid which is a homopolymer of L-form, poly-D-lactic acid which is a homopolymer of D-form, or a stereocomplex polylactic acid which is a mixture thereof.

Examples of the cellulose resin can include methylcellulose, ethyl cellulose, hydroxycellulose, hydroxymethyleellulose, hydroxyethyl cellulose, hydroxyethyl methylcellulose. hydroxypropylmethylcellulose, cellulose acetate, cellulose propionate. and cellulose butyrate.

Examples of the above thermosetting resin can include unsaturated polyester resins, vinyl ester resins, epoxy (EP) resins, melamine (MF) resins, phenol resins (PF), urethane resins (PU), polyisocyanate, polyisocyanurate, polyimide (PI), urea (UF) resins, silicone (SI) resins, furan (FR) resins, benzoguananune (BR) resins, alkyd resins, xylene resins, bismaleimide triazine (BT) resins, and diallyl phthalate resin (PDAP).

Examples of the unsaturated polyester resin can include resin which can be obtained by esterification reaction of aliphatic unsaturated dicarbxylic acid and aliphatic diol.

Examples of the vinyl ester resin can include bis vinyl ester resins and novolac vinyl ester resins.

Examples of the epoxy resin can include bisphenol A epoxy resins, bisphenol F epoxy resins, bisphenol E epoxy resins, bisphenol S epoxy resins, bisphenol M epoxy resins (4,4'-(1,3-phenylenediisopropylidene)bisphenol epoxy resins), bisphenol P epoxy resins (4,4'-(1,4-phenylenediisopropylidene)bisphenol epoxy resins), bisphenol Z epoxy resins (4,4'-cyclohexylidne bisphenol epoxy resins), phenol novolac epoxy resins, cresol novolac epoxy resins, tetraphenol group ethane novolac type epoxy resins, novolac epoxy resins having a condensed ring aromatic hydrocarbon structure, biphenyl epoxy resins, aralkyl epoxy resins such as xylylene epoxy resins and phenyl aralkyl epoxy resins, naphthylene ether epoxy resins, naphthol epoxy resins, naphthalene diol epoxy resins, bifunctional or tetrafunctional epoxy naphthalene resins, binaphthyl epoxy resins, naphthalene aralkyl epoxy resins, anthracene epoxy resins, phenoxy epoxy resins, dicyclopentadiene epoxy resins, norbornene epoxy resins, adamantane epoxy resins, and fluorene epoxy resins.

Examples of the melamine resin can include a polymer formed by polycondensation of melamine (2,4,6-triamino-1,3,5-triazine) and formaldehyde.

Examples of the phenolic resin can include novolac phenolic resins such as phenol novolac resins, cresol novolac resins, and bisphenol A novolac resins, resol phenol resins such as methylol resol resins and dimethylene ether resol resins, or aryl alkylene phenol resins, and include one of these or combinations of two or more.

Examples of the urea resin can include a resin obtained by condensation of urea and formaldehyde.

The above thermoplastic resin or the above thermosetting resin may be used singly or in combinations of two or more.

The glass fiber-reinforced resin composition of the present embodiment is used in applications that require low dielectric properties. Thus, as the resin, preferred are epoxy resins, modified polyphenylene ethers, polybutylene terephthalate, polypropylene, fluorine resins, and liquid crystal polymer (LCP).

Examples of other additives can include reinforcing fiber other than glass fiber, a filler other than glass fiber, a flame retardant, an UV absorber, a heat stabilizer, an antioxidant, an antistatic agent, a fluidity improver, an anti-blocking agent, a lubricant, a nucleating agent, an antibacterial agent, and pigment.

Examples of the reinforcing fiber other than glass fiber include carbon fiber and metal fiber.

Examples of the filler other than glass fiber include glass powder, talc, and mica.

The glass fiber-reinforced resin composition of the present embodiment may be prepreg obtained by impregnating the glass fiber woven fabric of the present embodiment with the resin by a known method per se and semi-curing the woven fabric.

The glass fiber-reinforced resin composition of the present embodiment can be molded by known molding methods such as injection molding method, injection compression molding method, two-color molding method, hollow molding method, foam molding method (including supercritical fluid), insert molding method, in-mold coating molding method, extrusion molding method, sheet molding method, thermoforming method, rotational molding method, laminate molding method, press molding method. blow molding method, stamping molding method, infusion method, hand lay-up method, spray-up method, resin transfer molding method, sheet molding compound method, bulk molding compound method, pultrusion method, and filament winding method to obtain various glass fiber-reinforced resin molded products. Curing the prepreg can also provide glass fiber-reinforced resin molded products.

Examples of applications of such molded products can include electronic device housing, electronic components, vehicle exterior members, vehicle interior members, vehicle engine members, muffler members, and high pressure tanks.

Examples of the electronic components include printed wiring boards.

Examples of the vehicle exterior members include bumpers, fenders, bonnets, air dams, and wheel covers.

Examples of the vehicle interior members include door trims and ceiling materials.

Examples of the vehicle engine members include oil pans, engine covers, intake manifolds, and exhaust manifolds.

Examples of the muffler members include silencers.

The glass fiber of the present embodiment can be suitably used as a reinforcing material for inorganic materials such as gypsum and cement, in addition to the glass fiber-reinforced resin composition of the present embodiment. For example, when used as a reinforcing material for gypsum (a gypsum board having a thickness of 4 to 60 mm in particular), the glass fiber comprising the glass composition in the above range can be included in a range of 0.1 to 4.0% by mass with respect to the total mass of mum.

Examples and Comparative Example of the present invention will be shown.

Examples

At first, glass raw material was mixed to obtain a glass batch so that the glass composition after melt-solidification was the composition of Examples 1 to 7 shown in Table 1 or Comparative Examples 1 to 6 shown in Table 2.

Next, the glass batch corresponding to the glass composition for glass fiber of each Example or Comparative Example was placed in an 80 mm diameter platinum crucible. melted at a temperature of 1650° C. for 24 hours, and taken out of the crucible to obtain glass bulk. The thus obtained glass bulk was slowly cooled at a temperature of 580° C. for 2 hours, and the number of bubbles per g of the glass was counted. The results are shown in Tables 1 and 2.

Next, the glass batch corresponding to the glass composition for glass fiber of each Example or Comparative Example was placed in an 80 mm diameter platinum crucible, the temperature was increased from room temperature to 1650° C. at a rate of 10° C./min, and the glass batch was melted at a temperature of 1650° C. for 2 hours. Thereafter, the temperature was lowered to 1450° C. at a temperature decrease rate of 10° C./min, and the time until the number of bubbles per g of the glass was reduced to 1 or less was measured, and this time was determined as a defoam process time. The defoam process time was evaluated as "excellent" when the time until the number of bubbles per g of the glass was reduced to 1 or less was within 10 minutes after the temperature decrease to 1450° C., was evaluated as "good" when the time was less than 30 minutes, and was evaluated as "poor" when the time was 30 minutes or more. The results are shown in Tables 1 and 2 as Defoam Process Time.

Next, the glass batch corresponding to the glass composition for glass fiber of each Example or Comparative Example was placed in an 80 mm diameter platinum crucible, the temperature was increased from room temperature to 1650° C. at a rate of 10° C./min, and the glass batch was melted at a temperature of 1650° C. for 2 hours. Thereafter, the temperature was lowered to 1450° C. at a temperature decrease rate of 10° C./min, and kept for 10 minutes, and the resultant glass batch was taken out of the crucible to obtain homogenous glass bulk. The thus obtained glass bulk was slowly cooled at a temperature of 580° C. for 2 hours to obtain a test piece. The test piece was polished to prepare an 80 mm×3 mm (1 mm thickness) polished test piece. Then, the obtained polished test piece was completely dried and then stored in a room at a temperature of 23° C. and a humidity of 60% for 24 hours. Subsequently, for each of the obtained polished test pieces, according to JIS C 2565: 1992, the dielectric constant (dielectric constant Dk) and dielectric loss tangent (dissipation factor Df) at 10 GHz were measured using a cavity resonator method dielectric constant measuring apparatus (manufactured by AET, Inc., trade name: ADMS01Ocl). The dielectric constant was 4.3 and the dielectric loss tangent was 0.0015 in Example 1, the dielectric constant was 4.3 and the dielectric loss tangent was 0.0016 in Examples 4 and 7, and the dielectric constant was 4.3 and the dielectric loss tangent was 0.0018 in Example 6.

TABLE 1

|  | Example 1 | Example 2 | Example 3 | Example 4 | Example 5 | Example 6 | Example 7 |
|---|---|---|---|---|---|---|---|
| $SiO_2$ (parts by mass) | 51.1 | 52.7 | 53.5 | 56.5 | 53.0 | 51.5 | 54.9 |
| $B_2O_3$ (parts by mass) | 24.1 | 23.7 | 23.3 | 21.2 | 23.7 | 24.4 | 21.2 |
| $Al_2O_3$ (parts by mass) | 15.1 | 12.4 | 12.3 | 14.5 | 12.3 | 16.3 | 15.5 |
| MgO (parts by mass) | 0.5 | 1.5 | 1.5 | 0.5 | 1.5 | 2.1 | 0.5 |
| CaO (parts by mass) | 3.1 | 5.0 | 4.8 | 2.3 | 5.0 | 1.7 | 2.4 |
| SrO (parts by mass) | 3.6 | 0.4 | 2.8 | 3.4 | 0.4 | 2.2 | 3.6 |
| $TiO_2$ (parts by mass) | 1.0 | 3.0 | 1.0 | 1.0 | 2.9 | 1.0 | 1.1 |
| $F_2$ (parts by mass) | 1.5 | 1.3 | 0.8 | 0.6 | 1.2 | 0.8 | 0.8 |
| $Na_2O$ (parts by mass) | 0.0 | 0.0 | 0.0 | 0.0 | 0.0 | 0.0 | 0.0 |
| $Fe_2O_3$ (parts by mass) | 0.0 | 0.0 | 0.0 | 0.0 | 0.0 | 0.0 | 0.0 |
| Total (parts by mass) | 100.0 | 100.0 | 100.0 | 100.0 | 100.0 | 100.0 | 100.0 |
| $Nb_2O_5$ (mass %) | 0.0013 | 0.0014 | 0.0029 | 0.0254 | 0.0028 | 0.0426 | 0.0005 |
| $SO_3$ (mass %) | 0.0052 | 0.0047 | 0.0062 | 0.0056 | 0.0048 | 0.0039 | 0.0042 |
| $SO_3/Nb_2O_5$ | 4.00 | 3.36 | 2.14 | 0.22 | 1.71 | 0.09 | 8.40 |
| Number of Bubbles (/g) | 0 | 0 | 0 | 0 | 0 | 0 | 0 |
| Defoam Process Time | Excellent | Excellent | Excellent | Excellent | Excellent | Good | Good |

TABLE 2

|  | Comparative Example 1 | Comparative Example 2 | Comparative Example 3 | Comparative Example 4 | Comparative Example 5 | Comparative Example 6 |
|---|---|---|---|---|---|---|
| $SiO_2$ (parts by mass) | 54.9 | 56.5 | 56.4 | 52.4 | 51.1 | 51.7 |
| $B_2O_3$ (parts by mass) | 21.2 | 21.2 | 19.3 | 24.1 | 24.1 | 24.4 |
| $Al_2O_3$ (parts by mass) | 15.5 | 14.5 | 16.5 | 12.4 | 15.1 | 16.3 |
| MgO (parts by mass) | 0.5 | 0.5 | 0.5 | 1.5 | 0.5 | 2.1 |
| CaO (parts by mass) | 2.4 | 2.3 | 2.3 | 4.9 | 3.1 | 1.7 |
| SrO (parts by mass) | 3.6 | 3.4 | 3.2 | 0.4 | 3.5 | 2.0 |
| $TiO_2$ (parts by mass) | 1.1 | 1.0 | 1.0 | 2.9 | 1.0 | 1.0 |
| $F_2$ (parts by mass) | 0.8 | 0.6 | 0.8 | 1.4 | 1.6 | 0.8 |
| $Na_2O$ (parts by mass) | 0.0 | 0.0 | 0.0 | 0.0 | 0.0 | 0.0 |
| $Fe_2O_3$ (parts by mass) | 0.0 | 0.0 | 0.0 | 0.0 | 0.0 | 0.0 |
| Total (parts by mass) | 100.0 | 100.0 | 100.0 | 100.0 | 100.0 | 100.0 |
| $Nb_2O_5$ (mass %) | 0.0001 | 0.0741 | 0.1648 | 0.2058 | 0.0001 | 0.3096 |
| $SO_3$ (mass %) | 0.0039 | 0.0031 | 0.0036 | 0.0028 | 0.0038 | 0.0034 |
| $SO_3/Nb_2O_5$ | 39.00 | 0.04 | 0.02 | 0.01 | 38.00 | 0.01 |
| Number of Bubbles (/g) | 0 | 0 | 0 | 0 | 0 | 0 |
| Defoam Process Time | Poor | Poor | Poor | Poor | Poor | Poor |

As shown in Table 1, according to the glass batch corresponding to the glass composition for glass fiber of each of Examples 1 to 7, the number of bubbles obtained when the glass batch was melted at a temperature of 1650° C. for 24 hours was zero, the defoam process time was less than 10 minutes or less than 30 minutes, and it was thus obvious that the time necessary for the defoam process can be reduced.

On the other hand, as shown in Table 2, according to the glass batch corresponding to the glass composition for glass fiber of Comparative Example 1 or 5 in which the ratio of the content of $SO_3$ to the content of the $Nb_2O_5$ ($SO_3/Nb_2O_5$) was more than 13.70, or the glass batch corresponding to the glass composition for glass fiber of Comparative Example 2, 3, 4, or 6 in which the ratio of the content of $SO_3$ to the content of the $Nb_2O_5$ ($SO_3/Nb_2O_5$) was leas than 0.07, although the number of bubbles obtained when the glass batch was melted at a temperature of 1650° C. for 24 hours was zero, the defoam process time was 30 minutes or more, and it was thus obvious that the time necessary for the defoam process cannot be reduced.

The invention claimed is:

1. A glass fiber comprising a glass filament formed from a glass composition for glass fiber, the glass composition comprising:

$Nb_2O_5$ in a range of 0.0001 to 0.3500% by mass, and $SO_3$ in a range of 0.0010 to 0.0100% by mass, with respect to a total amount of the glass composition for glass fiber, wherein assuming that a rest of the total amount of the glass composition for glass fiber excluding $SO_3$ and $Nb_2O_5$ is 100 parts by mass, the glass composition for glass fiber comprises:

$SiO_2$ in a range of 48.0 to 60.0 parts by mass, $B_2O_3$ in a range of 18.4 to 27.0 parts by mass, $Al_2O_3$ in a range of 10.8 to 17.0 parts by mass, MgO in a range of 0 to 2.5 parts by mass, CaO in a range of 0. to 6.0 parts by mass, SrO in a range of 0 to 4.5 parts by mass, $TiO_2$ in a range of 0.5 to 3.5 parts by mass, and $F_2$ and $Cl_2$ in a range of 0 to 2.5 parts by mass in total, and a ratio of a content of $SO_3$ to a content of $Nb_2O_5$ ($SO_3/Nb_2O_5$) is in a range of 0.07 to 13.70, and wherein assuming that the rest of the total amount of the glass composition for glass fiber excluding $SO_3$ and $Nb_2O_5$ is 100 parts by mass, the glass composition for glass fiber comprises oxides of Ba, Co, Ni, Cu, Mo, W, Ce, Y, La, Bi, Gd, Pr, Sc, or Yb in the range of less than 3.00 parts by mass in total.

2. A glass fiber woven fabric comprising the glass fiber according to claim 1.

3. A glass fiber-reinforced resin composition comprising the glass fiber according to claim 1.

* * * * *